United States Patent Office.

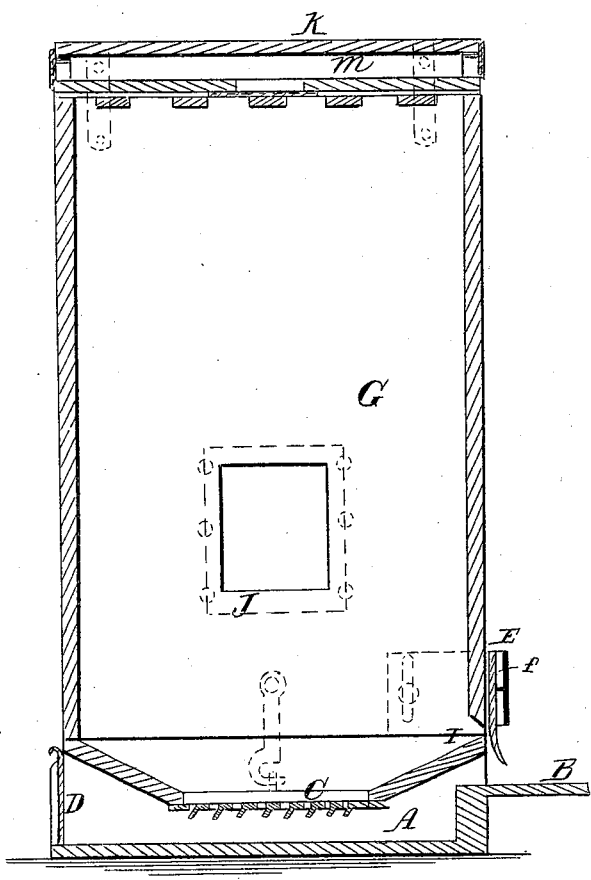

GEORGE A. ROBINSON, OF MOUNT PULASKI, ILLINOIS.

Letters Patent No. 93,009, dated July 27, 1869.

IMPROVEMENT IN BEE-HIVES.

The Schedule referred to in these Letters Patent and making part of the same.

*To all whom it may concern:*

Be it known that I, GEORGE A. ROBINSON, of Mount Pulaski, in the county of Logan, and State of Illinois, have invented a new and useful Improvement in Bee-Hives; and I do hereby declare that the following is a full, clear, and exact description thereof, which will enable others skilled in the art to make and use the same, reference being had to the accompanying drawing, forming part of this specification.

This invention relates to new and useful improvements in bee-hives, and consists in the construction and arrangement of parts as hereinafter described.

The accompanying drawing represents a vertical section of a bee-hive, constructed according to my invention.

A is the moth-box, at the bottom of the hive.

B is a platform.

C is a perforated bottom for allowing the dirt, and also any moth that may gain access into the hive above, to pass through into the box A.

D is a sliding door for cleaning out the moth-box.

E is a double adjustable slide for closing the entrance for the bees when desired, and also for catching the moths in the recess *f*, when they crawl down on the outside of the hive.

G represents the hive.

The bees enter the hive at I.

Both bees and moths will light on the platform B. The moths will naturally crawl from the platform into the moth-box A, but the bees, from an instinctive regard to their own safety, will take the entrance I, and ascend into the hive.

J represents slides on one or more sides of the hive, which cover glass windows for admitting light, and allowing the interior of the hive to be inspected.

The hive is ventilated by means of a perforated piece of metal on the under side of the cover K, through which the air passes into an orifice, *m*, made width-wise through the top or cover, as seen in the drawing.

Having thus described my invention,

What I claim as new, and desire to secure by Letters Patent, is—

The construction and arrangement of the moth-box A, the platform B, the bee-orifice I, and the slide E, substantially as and for the purposes described.

The above specification of my invention signed by me, this 17th day of April, 1869.

GEORGE A. ROBINSON.

Witnesses:
JNO. W. SEYFER,
F. M. YOKEM.